Dec. 26, 1967 D. L. PLAISTOWE 3,360,680

STORAGE TUBE CIRCUIT ARRANGEMENTS

Filed June 28, 1962

INVENTOR

BY Donald Leopold Plaistowe

Baldwin & Wight

ATTORNEYS

United States Patent Office 3,360,680
Patented Dec. 26, 1967

3,360,680
STORAGE TUBE CIRCUIT ARRANGEMENTS

Donald Leopold Plaistowe, Chelmsford, England, assignor to The Marconi Company Limited, a company of Great Britain Filed June 28, 1962, Ser. No. 206,015
Claims priority, application Great Britain, Aug. 31, 1961, 31,317/61
13 Claims. (Cl. 315—8.5)

Figures 1, 2:
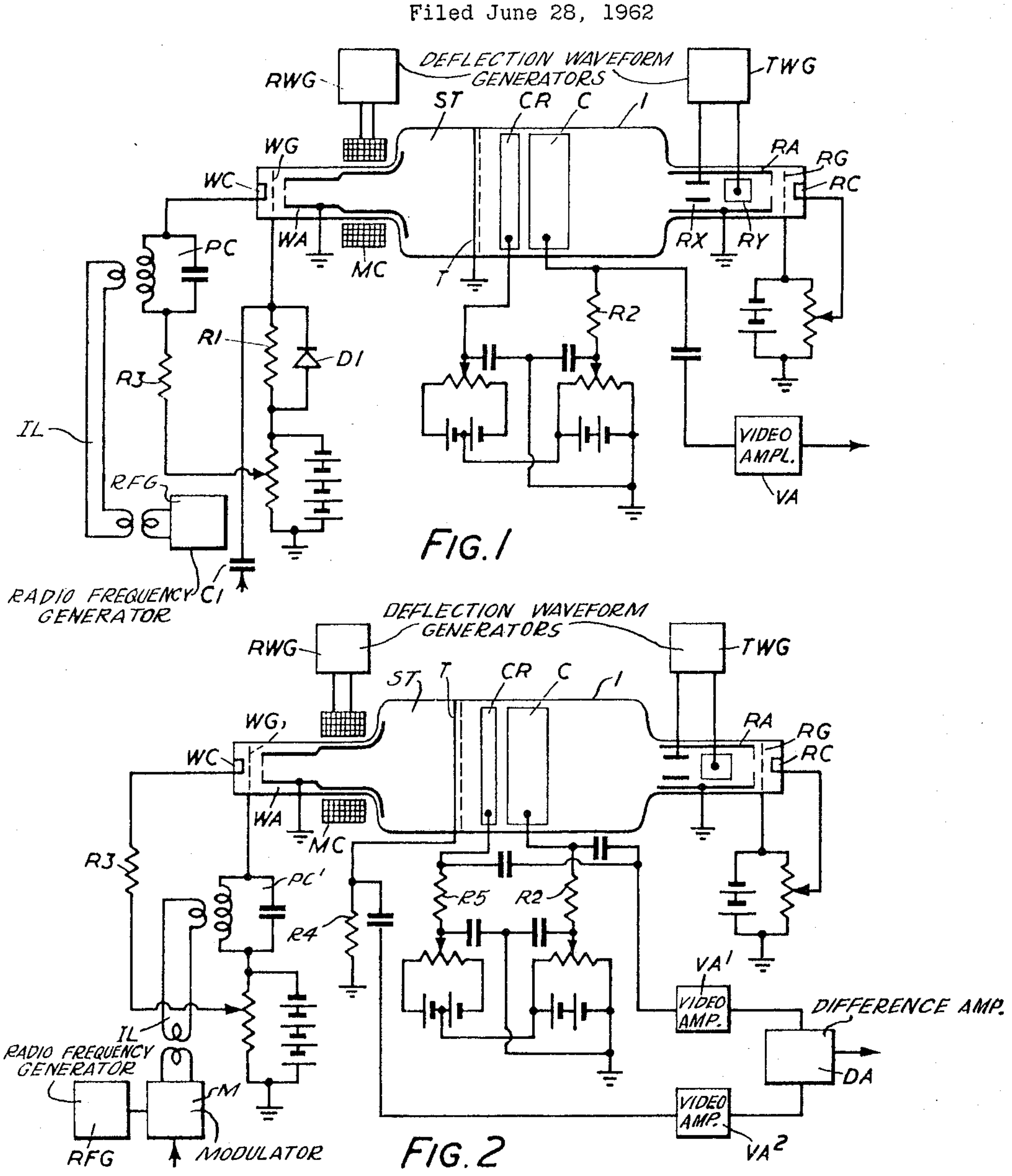

This invention relates to storage tube circuit arrangements and more particularly to such arrangements employing storage tubes of the kind in which a writing electron beam thereof is adapted to be modulated with input signals to provide corresponding charges on a charge storage target.

It is the object of the invention to provide improved storage tube arrangements in which the resolution of the storage tube is improved in comparison with known comparable arrangements. Although not limited in its application thereto, the invention is particularly useful when used in conjunction with so-called scan-conversion storage tubes wherein the writing beam is scanned, in accordance with one set of scanning standards, across a storage target to vary the conductivity of a layer of bombardment induced conductivity (B.I.C.) material thereon and so provide stored charges corresponding to the conductivity variation, and wherein a reading beam is scanned across the target, in accordance with a different set of scanning standards, to provide output signals corresponding to the stored signals.

According to this invention a storage tube circuit arrangement comprises a storage tube including a storage target and means for scanning the same with a modulated writing electron beam to store on said target signals corresponding to the modulation; means for subjecting said writing beam to intensity modulation in accordance with pulsed input signals; and means for interrupting the beam during each pulse.

According to a feature of this invention a storage tube circuit arrangement comprises a storage tube including a storage target having a layer of bombardment induced conductivity material thereon; a writing electron gun adapted to project a beam of high velocity electrons to reach said layer; means for scanning said beam across said target in accordance with a predetermined scanning pattern, means for applying input pulses to modulate said beam so as to suppress said beam at times other than the times of occurrence of said pulse; and means for interrupting said beam during each of said times of occurrence.

Preferably the interruption during pulses is obtained by subjecting the writing beam to relatively high frequency modulation additional to the pulse modulation. The total modulation of the beam may be obtained by applying the pulses to modulate a high frequency and applying the resultant pulse modulated high frequency to modulate the beam. It may also be in effect obtained in the tube itself by applying the high frequency and the pulses to the same beam modulating electrode in the tube or by applying the high frequency to one and the pulses to another of two different beam modulating electrodes in the tube.

Preferably a tuned circuit tuned to the high frequency is provided in series in the circuit of the tube electrode to which said high frequency is to be applied and said high frequency is inductively coupled thereto.

In all the embodiments of the invention a high value negative feedback resistance is preferably connected in series in the cathode circuit of the writing gun.

A preferred arrangement in accordance with the invention comprises a storage tube having a writing eletcron gun at one end, a reading electron gun at the opposite end, a storage target, adapted to be scanned by the writing beam and the reading beam and comprising a thin conductive back-plate having, on the side thereof nearer the reading gun, a layer of normally insulating material adapted to vary its conductivity under the bombardment of an electron beam and a collector electrode positioned between said target and said reading gun and adapted, in use, to receive electrons given off from said layer; means for deflecting said writing beam, in accordance wtih one scanning pattern across said target to provide, on the side of said normally insulating layer remote from the writing gun, a charge pattern corresponding to the input pulses to be stored and resulting from changes in the conductivity of said layer due to the impingement thereon of the writing beam; means for deflecting said reading beam across said target in accordance with a different scanning pattern thereby to discharge the stored charges on the target and cause said target to emit secondary electrons; and means for taking off from said tube output signals resulting from the emission of secondary electrons from the target.

Preferably the storage tube is provided with a so-called "corrector ring" electrode positioned between the target and the collector electrode.

Output signals may be taken from said collector electrode but are preferably taken from the back-plate of said storage target.

Preferably, also, there are provided means for taking output signals separately from the back-plate of the storage electrode, the collector electrode and the corrector ring electrode, means for combining the signals from the collector electrode and the corrector ring electrode and means for applying said combined signals and the signals from said back-plate as the two inputs of a difference amplifier whereby certain spurious signals are eliminated from the output of said difference amplifier.

Figure 3:
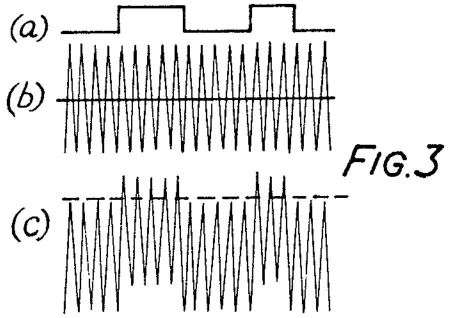
Figure 4:
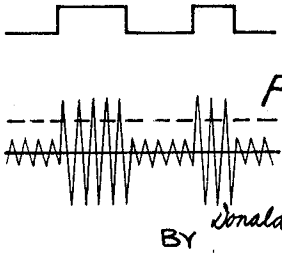

The invention is further described with reference to and illustrated in the accompanying drawings of which FIGURES 1 and 2 are circuit diagrams of two embodiments of the invention and FIGURES 3 and 4 are graphical figures relating to the embodiments of FIGURES 1 and 2 respectively. In FIGURES 1 and 2 like parts carry like references.

Referring to FIGURE 1, ST is a storage tube of the so-called scan conversion type comprising within a glass envelope 1, a writing electrode gun conventionally represented as comprising a cathode WC, a control grid WG and an anode WA, represented as a cylinder connected to a wall coating of the tube. At the opposite end of the storage tube is a reading electron gun conventionally represented as comprising a cathode RC, a control grid RG and a cylindrical anode RA.

Within the enlarged central part of the tube and between the two electron guns is provided a storage target T comprising an aluminium mesh on one side of which (the side nearer the writing gun) is provided a thin aluminium back-plate which covers the wires of the mesh and fills the interstices thereof. On the opposite side of the mesh (that nearer the reading gun) is provided a thin layer of bombardment induced conductivity (B.I.C.) material, such as aluminium oxide, and which also covers the wires of the mesh and fills the interstices thereof. A B.I.C. material is, of course, one which is normally an insulator but whose conductivity is increased under the bombardment of an electron beam to an extent determined by the intensity of the beam.

Between the storage target T and the reading gun is a cylindrical collector electrode C adapted to collect electrons given off by the storage target and between the target and the collector electrode is a further generally ring shaped electrode CR (which is sometimes referred to as a corrector ring, or an anti-blotch electrode), which serves in known manner to correct distortion in the output signals taken from the tube.

The cathode RC of the reading gun is maintained at such a potential (e.g. —1.5 kv.) that when electrons of the reading beam strike the target T whose aluminium back-plate is earthed, secondary electrons in excess of the number of primary electrons striking the target are given off. The potential of the cathode RC is maintained in a manner such as that conventionally illustrated at a slightly positive potential with respect to the control grid RG and the anode RA is earthed.

In operation the reading electron beam is switched on and is deflected in accordance with a television raster by means of the two mutually perpendicular pairs of deflecting plates RX and RY to which are fed scanning waveforms from the waveform generator TWG. The secondary electrons given off from the B.I.C. layer of the target T are collected on the collector electrode C and the corrector ring CR, both of which are maintained at a positive potential (e.g. about +50 volts) with respect to the back-plate of the target electrode in the manner conventionally illustrated. As a result of the secondary emission the B.I.C. layer adopts a positive potential which approaches that of the collector electrode.

The cathode of the writing gun is maintained, for example in the manner conventionally illustrated, at a high negative potential (e.g. —10 kv.) with respect to the target, and input signals to be stored, such for example as radar echo pulses, are applied to the control grid WG through a condenser C1 to modulate the writing beam, the input pulses being D.C. restored, in known manner, by means of resistance R1 and diode D1. The writing beam is deflected in polar co-ordinate manner, such as in a P.P.I. display, by means of coils MC to which are applied from the waveform generator RWG radial deflection signals which vary in known manner in accordance with the rotation of the scanning radar aerial from which the input pulses are derived.

The high velocity writing beam passes through the back-plate of the target electrode T and impinges on the B.I.C. layer, thus increasing its conductivity at the points of impingement of the writing beam. This causes those parts of the B.I.C. layer on the reading gun side and opposite the points struck by the writing beam to reduce in potential towards that of the back-plate so that a relatively negative-going charge pattern corresponding to a P.P.I. radar display is established. Subsequent scanning of the target T by the reading beam causes the relatively negatively charged parts of the target to increase in potential due to secondary emission, several scans of the reading beam usually being required to re-establish the potential of the face of the target nearer the reading gun at its previous value. The secondary electrons given off by the target and collected by the collector electrode correspond, with respect to the television type scanning pattern of the reading beam, to the charge pattern on the target electrode and, consequently, output signals derived from across the resistance R2 and amplified in the video amplifier VA may be utilized in known manner to provide a visual display of the television kind.

As so far described the arrangement is well known. In accordance with the present invention there is provided a radio frequency generator RFG providing an output oscillation whose oscillatory period is much shorter than the duration of the shortest input pulse to be stored.

For example the output of generator RFG may be of a frequency of about 9 mc./s. and is preferably an integral multiple of the line scan frequency of the reading beam so that there is no moving pattern in the final display. The output of generator RFG is loosely inductively coupled, by means of the coupling loop IL, to the parallel tuned circuit PC tuned to the frequency of generator RFG and connected in series between the writing gun cathode WC and the biasing arrangement therefor. Also in series with the circuit PC is connected a high resistance R3 which serves to provide negative feedback and so linearize the writing gun characteristic, the use of loose inductive coupling between generator RFG and circuit PC causing undesired capacitive reactance effectively in parallel with R3 to be kept to a minimum. Clearly, of course, both the high frequency oscillation and the input pulses could, if desired, be applied to only one of the tube electrodes, e.g. the control grid WG.

The bias provided between the cathode WC and grid WG is such as to bias the writing gun well beyond cutoff and the amplitude of the radio frequency signal applied between the cathode WC and grid WG is such that at the peaks of this signal which reduce the bias to its minimum value the writing gun is only just cut off. On the application of input signals from the condenser C1 to the grid WG, the writing gun is switched on at the times of occurrence of the peaks of the radio frequency signals.

This is illustrated in FIGURE 3 where the waveform *a* represents the input pulses, waveform *b* the radio frequency signal and waveform *c*, in which the dashed line represents the cut off voltage of the writing gun, the combination of the effects of the input signal, the radio frequency signal and the standing bias of the tube. It will be seen that the writing beam is switched on only during the periods of occurrence of the input pulses and then only for very short periods.

Referring to FIGURE 2, which shows a further embodiment of the invention, the input pulses and the radio frequency signals from generator RFG are applied to a modulator M which produces an output consisting of the radio frequency signals modulated by the input pulses. The output of the modulator M is applied via the coupling loop IL to the tuned circuit PC′, tuned to the frequency of the generator RFG, connected in series between the control grid WG and the source of bias potential. The arrangement is such that over the periods of occurrence of the input pulses the amplitudes of the peaks of the modulated signals applied to grid WG are such as to switch on the writing beam, but in the periods between the input pulses the beam remains cut off. This is illustrated in FIGURE 4 in which the full-line straight-line represents the standing bias between the grid and cathode and the dashed line represents the cutoff potential of the beam. It will be seen that here again, as in the embodiment of FIGURE 1, the writing beam is only on during the periods of occurrence of the input pulses and then only for periods which are short compared with the input pulse duration.

The arrangement as so far described with reference to FIGURE 2 may, of course, be employed in place of the comparable arrangement of FIGURE 1.

In the case illustrated in FIGURE 2, the tube output signals are derived from the back-plate of the target electrode T and comprise the voltages developed across a resistance R4 connected in series between the back-plate of target T and earth. The arrangement, as illustrated in FIGURE 1, whereby output signals are taken only from the collector electrode C suffers from the defect that, for a given charge on the target T, the datum level of the signals derived from the collector electrode C and the amplitude of those signals varies in dependence on the position of the stored charge on the target T. This defect is overcome to some extent, as is well known, by the provision of the corrector ring CR but is not entirely eliminated. It has, however, been found in practice that where the output signals are derived from the back-plate of the target T, as illustrated in FIGURE 2, this defect is substantially overcome and the datum level and amplitude of the output signals are rendered substantially independent of the position on the target of the stored charge.

A further defect of comparable scan conversion storage tube arrangements as at present in common use is that when the intensity of the writing beam is increased beyond a certain level, so-called "burst" signals occur which are thought to be due to secondary (and perhaps primary) electrons given off by the target T and collected by the collector electrode C and due solely to the incidence on the target T of the writing beam. These "burst" signals are, of course, spurious signals and are highly undesirable. Although, with the arrangements of the present invention, these "burst" signals occur at the frequency of the radio frequency signals from the generator RFG and are therefore normally outside the pass band of the video amplifier to which the tube output signals are fed, they are nevertheless sometimes of sufficiently high amplitude as to produce corresponding outputs from the video amplifier, albeit of lower amplitude than the input "burst" signals. To overcome this defect, output signals are also taken, as illustrated in FIGURE 2, from both the collector electrode and the corrector ring (by means of resistances R2 and R5 connected in series with these electrodes), the signals from both the collector electrode and the corrector ring being combined in any suitable manner—as illustrated by connecting them both to the input of a signal video amplifier VA′. The combined signals from the collector electrode and corrector ring are, so far as signals corresponding to the stored pulses are concerned, of opposite polarity to those derived from the back-plate of target T but, so far as the spurious "burst" signals are concerned, these combined signals are of the same polarity. The output from the video amplifier $VA^1$, to which the combined signals from the collector electrode and corrector ring are fed, and the output from video amplifier $VA^2$, to which the back-plate signals are fed, are applied as separate inputs to a difference amplifier DA whose output is the final output signal. It will be seen that the spurious "burst" signals are cancelled in the difference amplifier while the wanted signals corresponding to the stored pulses are passed through with enhanced amplitude.

It will be appreciated that the arrangement as illustrated in FIGURE 1 whereby the input pulses and the radio frequency signals are separately applied to the writing gun may be employed with that arrangement illustrated in FIGURE 2 whereby the tube output signals are derived from the back-plate of the storage target T, either with or without the added feature of cancellation of the spurious "burst" signals.

The arrangement of the present invention, whereby the writing electron gun is not switched on during the whole of the period of occurrence of an input pulse but is switched on only for periods which are short relative to the said period of occurrence, is found to provide a considerable improvement in the resolution of the tube as compared with known comparable arrangements. The theory underlying this improvement is not entirely understood but the following explanation is believed to be the correct one. The utility of the invention, however, does not relay on the correctness of this explanation.

Where the present invention is not employed and the writing beam is switched on during the whole of the period of occurrence of an input pulse it is believed that the area of the B.I.C. layer whose conductivity is increased due to the impingement of the writing beam is greater in extent than the area of the layer which is actually impinged by the beam, and that the amount of this "spread" is a function of the area actually impinged by the writing beam. In the arrangements of the present invention, however, the area of the B.I.C. layer actually impinged by the beam is very much smaller than in the comparable known case due to the fact that during the period of occurrence of an input pulse the beam is switched on only for periods which are short in relation to the said period of occurrence, and consequently the amount of "spread" is much reduced. Furthermore a considerable part of such "spread" as does occur takes place inwardly of the boundaries of the area impinged by the beam during the period of occurrence of any one input pulse and consequently provides no deleterious effect. Hence the area of the B.I.C. layer from which secondary electrons are given off due to any one input pulse and resulting from the scanning of the target by the reading beam, is smaller than in the comparable known case and the resolution of the tube is thereby improved.

In a practical case with a storage tube which was specified by the makers as being suitable for use with a television scanning raster of 400 lines, and whose resolution was found in practice not to be improved (when employing a known circuit arrangement) by an increase in the number of lines in the scanning raster, it was found that, when the present invention was employed, such improved resolution was obtained that a scanning raster containing 575 lines could be usefully employed.

Furthermore it is found in practice that the use of the present invention allows the intensity of the reading beam to be increased, as compared with comparable known arrangements, without the usual consequent increase in the occurrence and amplitude of spurious "burst" signals, with the result that the contrast of the final display is improved.

The present invention is in sharp contradistinction to those otherwise comparable known arrangements in which the reading electron beam is modulated at a radio frequency which is high relative to the video frequencies in the input pulses to be stored. In such known arrangements the storage tube output signals are at the radio frequency and are passed through an amplifier or filter whose pass-band is such as substantially to reduce the effects of spurious "burst" signals. Such known arrangements, however, do not provide the improvement in resolution achieved by the present invention.

I claim:

1. A storage tube circuit arrangement comprising a storage tube including a storage target and means for scanning the storage target with a modulated writing electron beam to store on said target signals corresponding to the modulation; means for subjecting said writing beam to intensity modulation in accordance with pulsed input signals; and means for interrupting the writing beam during each pulse.

2. An arrangement as claimed in claim 1, wherein said means for interrupting the writing beam comprises means for subjecting the writing beam to a relatively high frequency modulation additional to the pulse modulation.

3. A storage tube circuit arrangement comprising a storage tube including a storage target having a layer of bombardment induced conductivity material thereon; a writing electron gun adapted to project a beam of high velocity electrons to reach said layer; means for scanning said beam across said target in accordance with a predetermined scanning pattern; means for applying input pulses to modulate said beam so as to suppress said beam at times other than the times of occurrence of said pulses; and means for interrupting said beam during each of said times of occurrence.

4. A storage tube circuit arrangement comprising a storage tube including a storage target; means for scanning the storage target with a modulated writing electron beam to store on said target signals corresponding to the modulation; and means for subjecting said writing beam to a total modulation which includes intensity modulation in accordance with pulsed input signals and interruption of the writing beam during each pulse, said total modulation means comprising a source of relatively high frequency signals, means for modulating said high frequency signals with said pulsed input signals, and means for applying the resultant pulse modulated high frequency to modulate the writing beam.

5. A storage tube circuit arrangement comprising a storage tube including a storage target and at least one beam modulating electrode; means for scanning the storage target with a modulated writing electron beam to store on said target signals corresponding to the modulation; and means for subjecting said writing beam to a total modulation which includes intensity modulation in accordance with pulsed input signals and interruption of the writing beam during each pulse, said total modulation means comprising a source of relatively high frequency signals, and means for applying the high frequency signals and the pulsed input signals to said beam modulating electrode, the writing beam being subjected to relatively high frequency modulation additional to the pulse modulation.

6. A storage tube circuit arrangement comprising a storage tube including a storage target and at least two different beam modulating electrodes; means for scanning the storage target with a modulated writing electron beam to store on said target signals corresponding to the modulation; and means for subjecting said writing beam to a total modulation which includes intensity modulation in accordance with pulsed input signals and interruption of the writing beam during each pulse, said total modulation means comprising a source of relatively high frequency signals, and means for applying the high frequency signals to one of said electrodes and the pulsed input signals to another of said electrodes, the writing beam being subjected to relatively high frequency modulation additional to the pulse modulation.

7. An arrangement as claimed in claim 6, and further comprising a tuned circuit tuned to the high frequency and connected in series in the circuit of the tube electrode to which said high frequency is to be applied, said high frequency being inductively coupled thereto.

8. A storage tube circuit arrangement comprising a storage tube including a storage target and a writing gun having a cathode; means for scanning the storage target with a modulated writing electron beam to store on said target signals corresponding to the modulation; means for subjecting said writing beam to intensity modulation in accordance with pulsed input signals; means for interrupting the writing beam during each pulse; and a high value negative feedback resistance connected in series in the cathode circuit of said writing gun.

9. A storage tube circuit arrangement comprising a storage tube having a writing electron gun at one end and a reading electron gun at the opposite end; a storage target including a thin conductive back-plate having, on the side thereof nearer said reading gun, a layer of normally insulating material adapted to vary its conductivity under the bombardment of an electron beam; a collector electrode positioned between said target and said reading gun for receiving electrons given off from said layer; means for subjecting the writing electron beam from said writing gun to intensity modulation in accordance with pulsed input signals and means for interrupting the writing beam during each pulse; means for deflecting said writing beam across said target in accordance with one scanning pattern to provide, on the side of said layer remote from the writing gun, a charge pattern corresponding to said pulsed input signals and resulting from changes in the conductivity of said layer due to the impingement thereon of said writing beam; means for deflecting the reading electron beam from said reading gun across said target in accordance with a different scanning pattern to discharge the charge pattern stored on said target and cause the target to emit secondary electrons; and means for taking off from said tube output signals resulting from the emission of secondary electrons from the target.

10. An arrangement as claimed in claim 9 wherein the storage tube is provided with a corrector ring electrode positioned between the target and the collector electrode.

11. An arrangement as claimed in claim 9 wherein output signals are taken from the collector electrode.

12. An arrangement as claimed in claim 9 wherein output signals are taken from the backplate of the storage target.

13. An arrangement as claimed in claim 12 and further including means for taking output signals separately from the backplate of the storage electrode, the collector electrode and the corrector ring electrode, means for combining the signals from the collector electrode and the corrector ring electrode, a difference amplifier having two inputs, and means for applying said combined signals and the signals from said backplate as the two inputs of said difference amplifier, whereby certain spurious signals are eliminated from the output of said difference amplifier.

References Cited

UNITED STATES PATENTS

| | | | |
|---|---|---|---|
| 2,837,643 | 6/1958 | Goodwin et al. ---- | 315—8.5 X |
| 3,003,110 | 10/1961 | Toulemonde ------ | 315—8.6 X |
| 3,046,440 | 7/1962 | Callick et al. ------ | 315—12 X |

HERMAN KARL SAALBACH, *Primary Examiner.*

BENNETT G. MILLER, ARTHUR GAUSS, *Examiners.*

S. CHATMON, JR., *Assistant Examiner.*